United States Patent [19]

Bucciarelli et al.

[11] 4,013,998
[45] Mar. 22, 1977

[54] SYSTEM TO RENDER CONSTANT THE PROBABILITY OF FALSE ALARM IN RADAR SIGNALS CONVERTED INTO NUMERICAL FORM

[76] Inventors: Tullio Bucciarelli, Piazza Tarquinia, 2, 00183 - Rome; Giovanni Picardi, Via Nicola Festa, 12, 00137 - Rome, both of Italy

[22] Filed: Nov. 29, 1974

[21] Appl. No.: 528,006

[30] Foreign Application Priority Data

Nov. 30, 1973 Italy ................................ 54005/73

[52] U.S. Cl. ............................ 340/146.2; 235/177; 343/5 DP; 343/7 A
[51] Int. Cl.² ...................... H04B 1/10; G06F 7/02
[58] Field of Search ............... 340/146.2; 235/177, 235/181, 150.53; 343/5 DP, 7 A, 7.7, 8

[56] References Cited

UNITED STATES PATENTS

| | | | |
|---|---|---|---|
| 3,614,626 | 10/1971 | Dillard | 343/5 DP |
| 3,622,987 | 11/1971 | Borkan | 340/146.2 |
| 3,670,151 | 6/1972 | Lindsay et al. | 235/177 |
| 3,701,149 | 10/1972 | Patton | 343/5 DP |
| 3,815,133 | 6/1974 | Yasusaka et al. | 343/8 |

*Primary Examiner*—Felix D. Gruber

[57] ABSTRACT

Apparatus for obtaining constant false alarm probability in radar signals comprising a means to transform analog radar signals into digital signals with a quantity of binary numbers high enough to cause the density of probability of the amplitude of the digital radar signal to be maintained at a constant value.

3 Claims, 8 Drawing Figures

SYSTEM TO RENDER CONSTANT THE PROBABILITY OF FALSE ALARM IN RADAR SIGNALS CONVERTED INTO NUMERICAL FORM

The present invention refers to a system for rendering constant the probability of false alarm in radar signals converted into numerical form.

More particularly, the present invention has as its object a system, to be applied to radar signals of the numerical type, in which the constancy of the probability of false alarm is obtained by the injection of noise in numerical form, without any appreciable loss of sensitivity.

As it is well known, a radar apparatus often is operated in an environment in which the limitation of its services results not only from the internal noise, but also from undesired echoes, such as for example, land or sea returns, the disturbing effect of rain, of "chaff", etc.

To distinguish the echo resulting from a target from the noise, it is possible to have recourse to a constant threshold, but the presence of undesired echoes, which may mask the useful signals, makes such a technique for discrimination unacceptable.

That drawback, substantially resulting from the non-constancy of the probability of false alarm, can be seen in the radar systems using computers to handle the data relating to the target, as well as in those in which the decision regarding the presence or the absence of a useful echo, is given by an operator who decides on the basis of the visual representation. It is therefore of the greatest importance, to overcome this drawback, to maintain constant the probability of false alarm.

Such a characteristic is indicated by the abbreviation CFAR (Constant False Alarm Rate).

For the purpose of achieving said characteristic, there have been developed, in the past, various systems, such as those based on circuits in which the threshold automatically varies with the power of the disturbance ("autogate").

The above-mentioned problems have been widely treated in the literature, and reference is made to the following:

G. Picardi & P. Ragonese: "Analysis of an Anti-Interference Circuit Obtained With Delay Lines," Alta Frequenza (High Frequency) No. 12, 1968.

T. Bucciarelli & G. Picardi: "A System Suitable to Eliminate Special Spurious Signals in the Extraction of Radar Informations", Alta Frequenza, Vol, XL, No. 12, 1971.

L. R. Wilson: "A Theoretical Analysis of the Performance of a CFAR Quantizer (Radio Detector)," Raytheon Memo LRW-50 (Mar. 25, 1965).

B. Minguzzi: "Comparison Between the Characteristics of Two Autogate Circuits", Selenia Technica Report No. 70002 IN.

G. Galati: The Autogate Circuit in Radar Detection: Analysis and Comparison of a Few Alternative Shapes, Selenia Technica Journal (Being Published).

The prior art systems, however, are applicable with success only to analog radar signals. Indeed, when applying the same to radar signals converted into numerical or digital form, the probability of false alarm, that is to say, the probability that there will be spurious echoes apparently coming from targets, is greater than when working with the signal prior to its conversion to a digital form.

There is, however, an increasingly greater need for use of digital types of radar equipment. The main object of the present invention, therefore, is to provide a system capable of guaranteeing the constancy of the probability of false alarm, even in the case of radar signals in digital form. Another object of the present invention is to provide a radar system which, taking advantage of the greater capability and high computing speed of digital systems, makes it possible to suitably solve every control problem, such as search, acquisition, and tracking of the target.

Among the advantages resulting from the present invention, must be stressed the high accuracy and the high level of reliability of the digital-type devices, whose optional employment is made possible by the constancy of the probability of false alarm ensured by the present invention.

Another advantage is constituted by the wide commercial availability either of the digital-type devices, or of the equipment which utilizes the present invention.

The solution proposed by the present invention finally makes possible the use of devices which affect only in a negligible manner the over-all cost of the entire system. It has been found according to the present invention that if in a radar system provided with analog-digital converters, there is introduced suitable means to cause the probability density of the amplitude of the signal to tend toward or maintain a constant value, in the conversion quantum, the probability of false alarm tends toward or remains at the value it would have in the absence of analog-digital conversion.

Therefore, the CFAR characteristic is obtained in this manner without any appreciable loss of sensitivity.

The object of the present invention, therefore, is a system to render constant the probability of false alarm in radar signals, characterized by means for converting analog radar signals into numbers with a fixed conversion quantification and for adding to these numbers subsequent bits, even if they are not all significant, in order to hold at a constant value, within the conversion quantum the density of probability of the amplitude of the thus elaborated radar signal.

The solution proposed as the preferred one in this invention provides essentially an injection of binary noise accomplished through a delay line as a means to perform the transformation of the radar signal.

According to the present invention, the preferred system to render constant the probability of false alarm in radar signals is characterized by the fact that it includes in combination:

a. Means to convert analog radar signals into digital form.

b. A first digital tapped delay line for the comparison between the signal present on the central terminal and the signals, preceding and following in time, which are present on the lateral taps.

c. Means for the generation of the binary noise to be injected into the circuit.

d. A second tapped digital delay line, with the same number of taps as the said first delay line $b.$, an having as input the digital noise generated by said means $c.$ e. A computing device which operates on the signals coming from corresponding taps of said first and second delay lines $b.$ and $d.$ f. A comparator means for the generation of a quantized video signal, by means of the comparison between the output signal of said computing device and the output of the central taps of said first and second delay line b. and d.

The present invention will now be described in detail, with special reference to the attached drawings which illustrate, both prior art arrangements and arrangements according to the present invention of the system for quantization of video signals, as well as certain graphs which illustrate operational characteristics.

Figure 5:
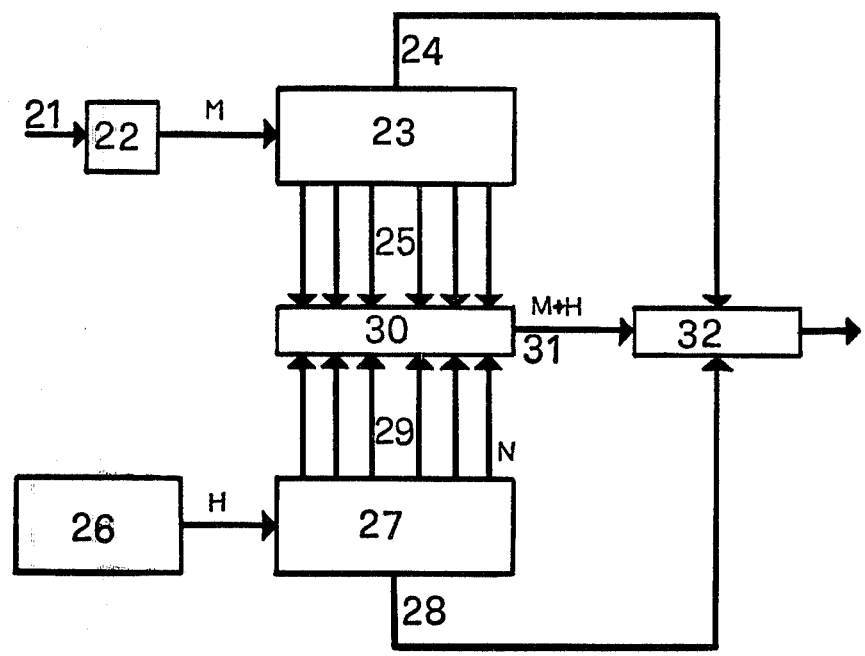
FIG. 5 is a block diagram of a preferred solution of a system according to the present invention.
Figure 8:
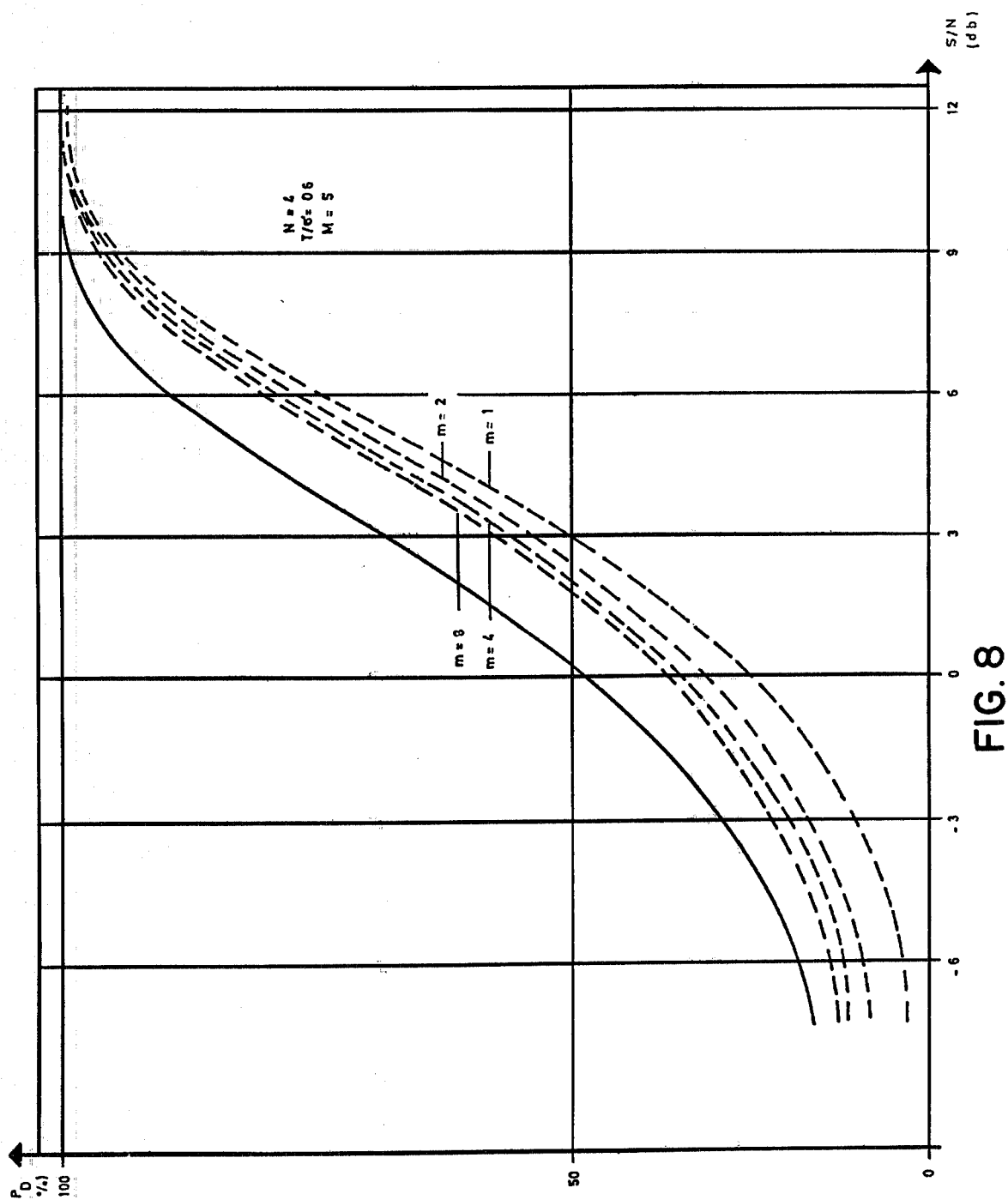

Finally, FIG. 8 is a graph which illustrates the change of the probability of detection as a function of the signal/noise ratio expressed in decibels for the system in FIG. 5.

Figure 1:
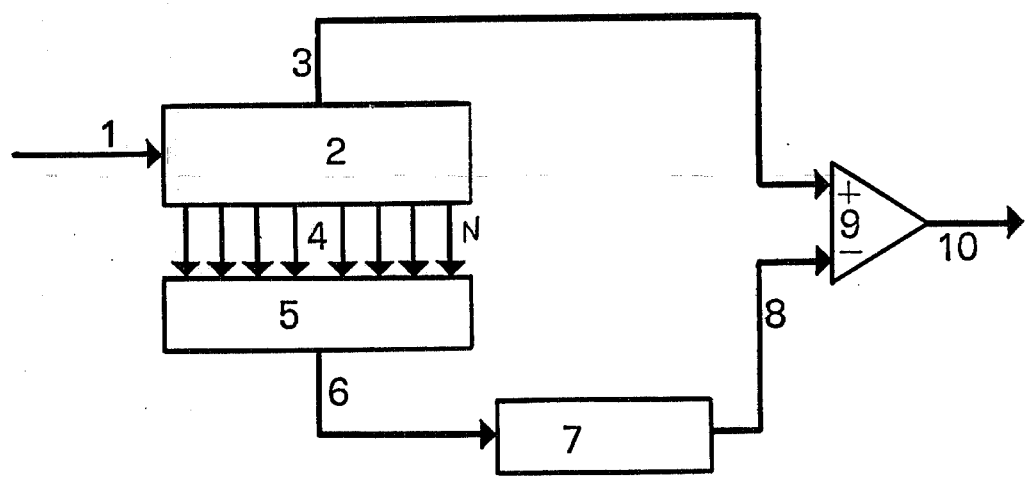
FIG. 1 is a block diagram which shows a conventional known system utilizing analog video signals.

With reference to FIG. 1, there is illustrated a system for the quantization of video signals 1, and which uses an analog tapped delay line 2 which supplies at the output the signal being studied on its central terminal 3 and the signals which are preceding and following it in time on the lateral terminals 4, the number of which is indicated by N. A computing device 5 works on said signals coming from the lateral terminals 4. Its output signal 6, through an amplifier 7, constitutes the threshold level 8 of a comparing device 9 which compares with it the signal coming from central terminal 3, supplying at the output a quantized video signal 10.

Figure 2:
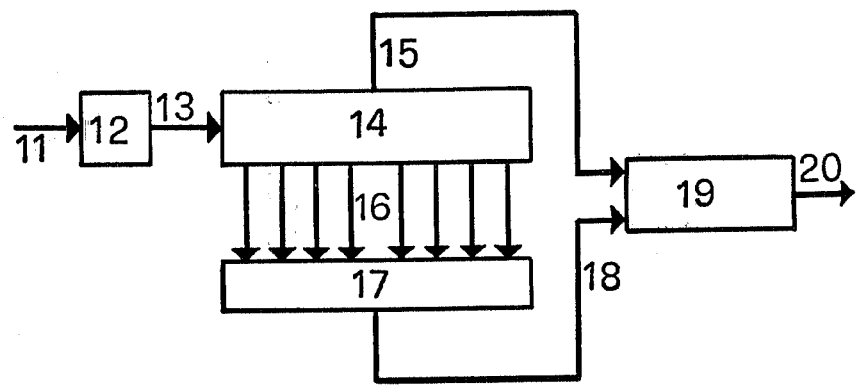
FIG. 2 is a block diagram representing the same logic as FIG. 1 using digital video signals.

In FIG. 2, there is shown a prior art system for the quantization of video signals, and which employs: an analog-digital converter 12, which works on the analog signal 11, supplying the digital value 13 of said signal to the digital delay line 14 which gives at the output, on the central tap 15, the signal being studied, and on the lateral taps 16 the signals which are preceding and following it in time, and a computing device 17 which sends down, as threshold 18 for comparator 19, the highest of said signals 16. The comparator 19 compares with said threshold 18 the signal 15 being studied, giving at the output, the quantized video signal 20.

Figure 3:
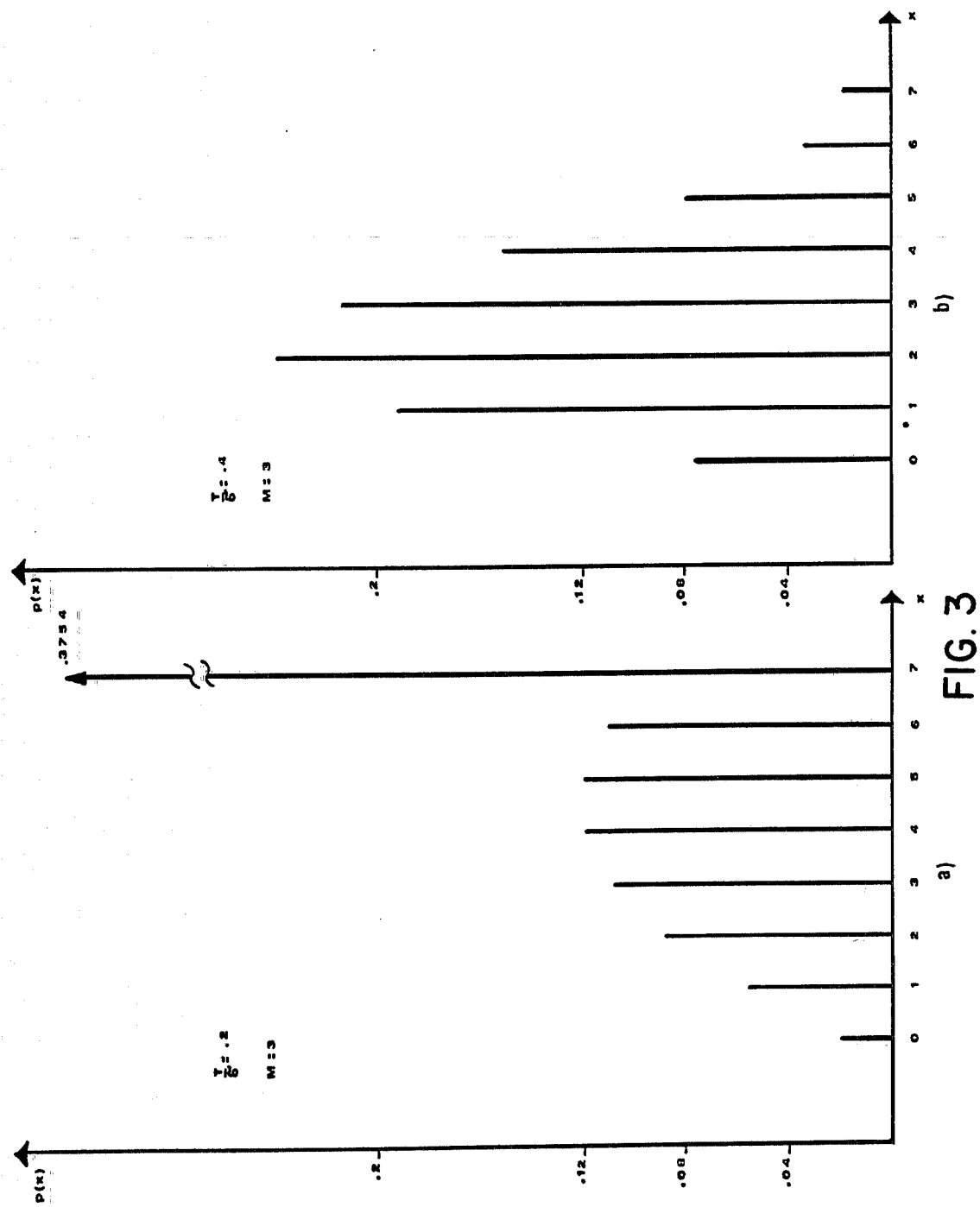
FIG. 3 is a graph showing the behaviour of the probability density of the amplitude of the radar signal in digital form, in a system following FIG. 2, as a function of the amplitude of the signal itself.

In the graph in FIG. 3, there is indicated in ordinate the behaviour of the probability density function $p(x)$ of the amplitude of the signal and in abscissa the amplitude of said $(x)$, the graph referring in part (a) to the case in which $T/\sigma = 0.2$, and part (b) to the case where $T/\sigma = 0.4$, T being the lower threshold of the conversion system, and $\sigma$ a parameter characteristic of the Rayleigh distribution. The number N of binary numbers or bits is equal to 3 in both cases. It must be noted that within each conversion step, the probability density function is zero.

Figure 4:
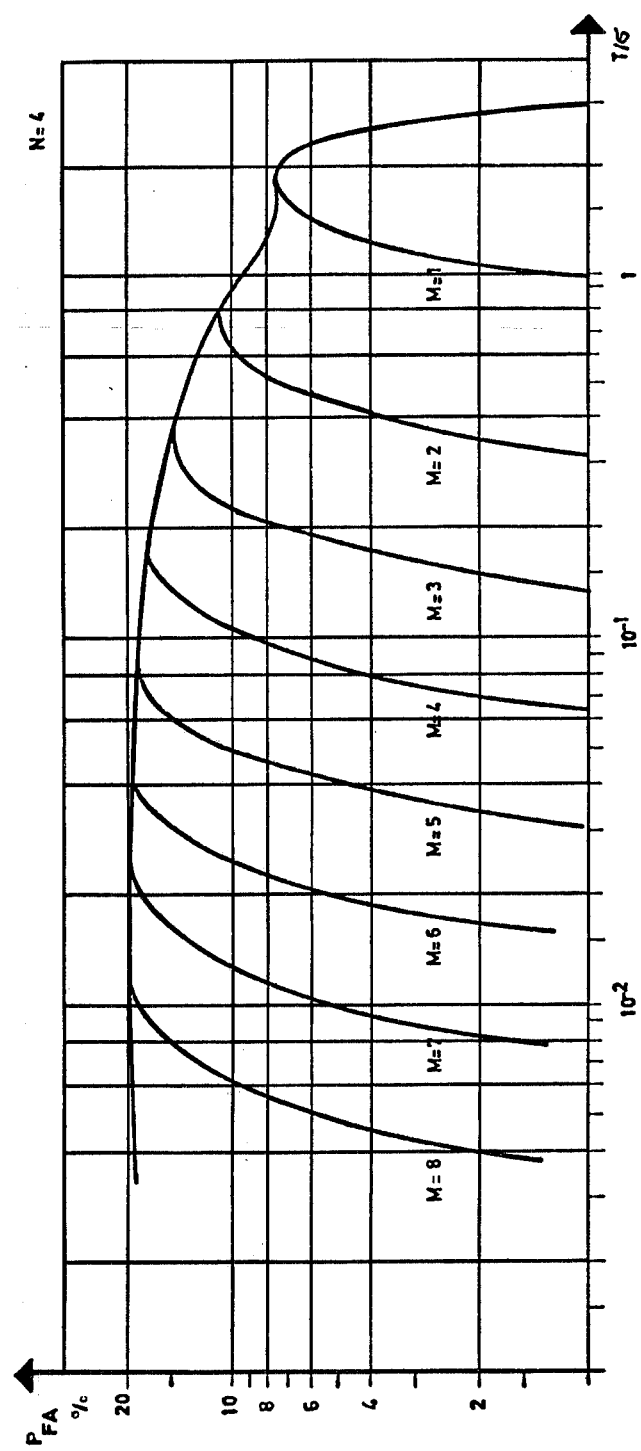
FIG. 4 is a graph which illustrates, for the system in FIG. 2, the change of the probability of false alarm as a function of ratio $T/\sigma$.

FIG. 4 is a graph which gives the behaviour of the false alarm probability Pfa (ordinate) as a function of $T/\sigma$ (abscissa) for various values of the parameter M which represents the number of bits of the converted video signal. The taps N of the delay line are four in number.

It may be noted that, in the considered $T/\sigma$ interval, and for the M values ranging between 1 and 8, the desired degree of constancy of the flase alarm is not reached.

FIG. 5 depicts the system of the present invention for the quantization of the video signals, using a converter 22 which works on an analog video signal 21 and sends it in digital form with M bits or noise numbers, to the digital delay line 23 which supplies at its output, through central tap 24, the signal being studied, and through lateral taps 25, being N in number, the signals preceding and following in time. A generator 26 provides digital noise with H binary numbers or bits, the output of which is connected to the input of the digital delay line 27, which in turn delivers as an output on the central terminal 28 as well as on the lateral terminals 29, also N in number, the successive digital values of the noise produced by generator 26. A computing device 30 operates by generating a single word of M bits on the basis of a suitable processing of the N words on the outputs 25, by generating a single noise word of H bits, processing the N words on the outputs 29, and finally by adding, like least significant bits, the H bits of said noise word on the right of the M bits of said generated signal word. In such a way, a single binary word corresponding to the value of the M+H bits is obtained.

The generating process preferably utilizes a majority logic. A comparing device 32, on the basis of the comparison of the signals 24, 28 and 31, supplies at the output the quantized video signal.

Figure 6:
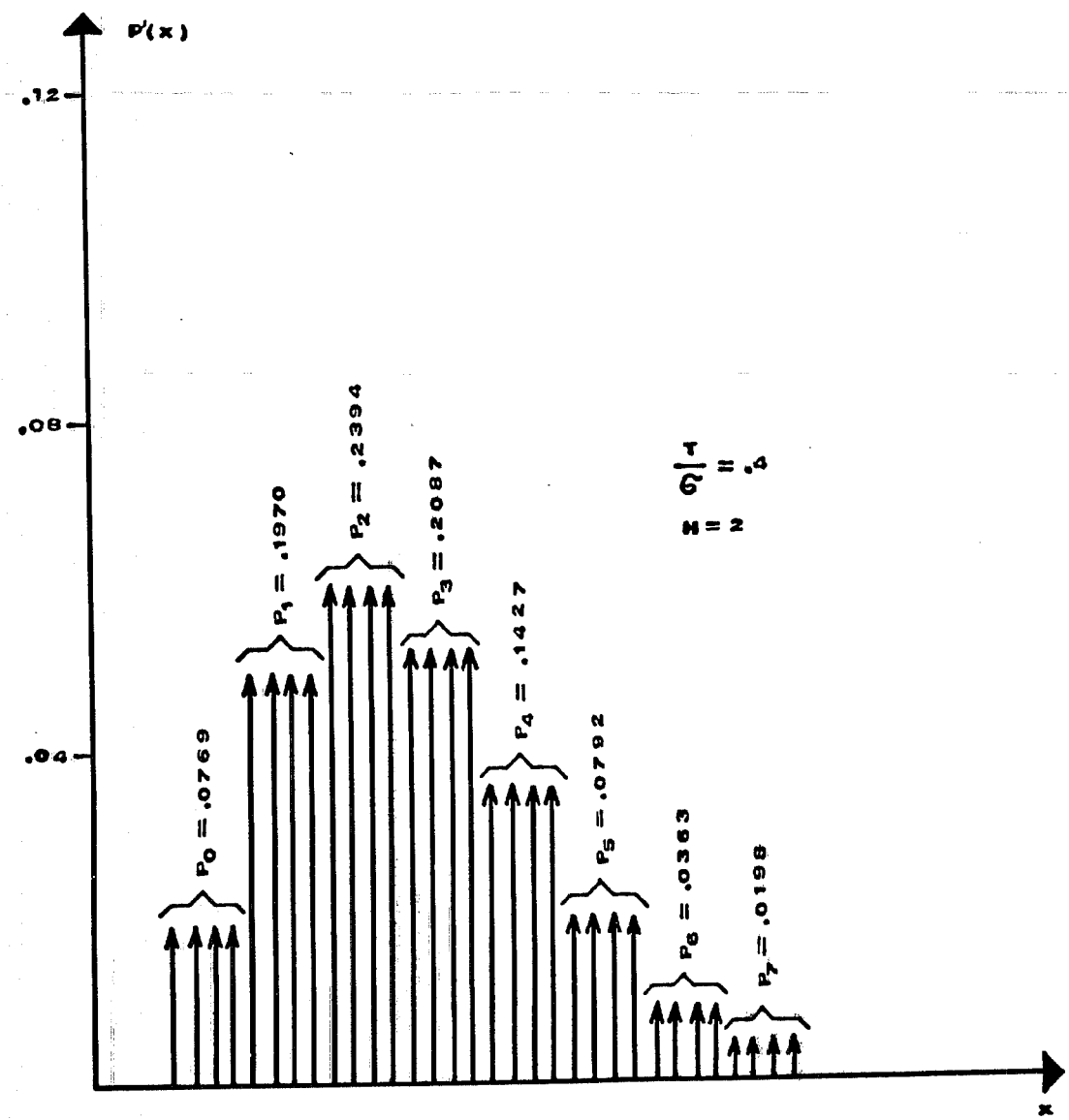
FIG. 6 is a graph relating to the behaviour of the probability density of the amplitude of the video signal in digital form, in a system according to FIG. 5, as a function of the amplitude of the signal itself.

FIG. 6 is a graph which shows the behaviour of the probability density $p'(x)$ of the signal, as a function of its amplitude $(x)$ in the case of $T/\sigma = 0.4$ and $H = 2$.

It may be noted here how the noise injection tends to render constant the $p'(x)$ value during the conversion step.

Figure 7:
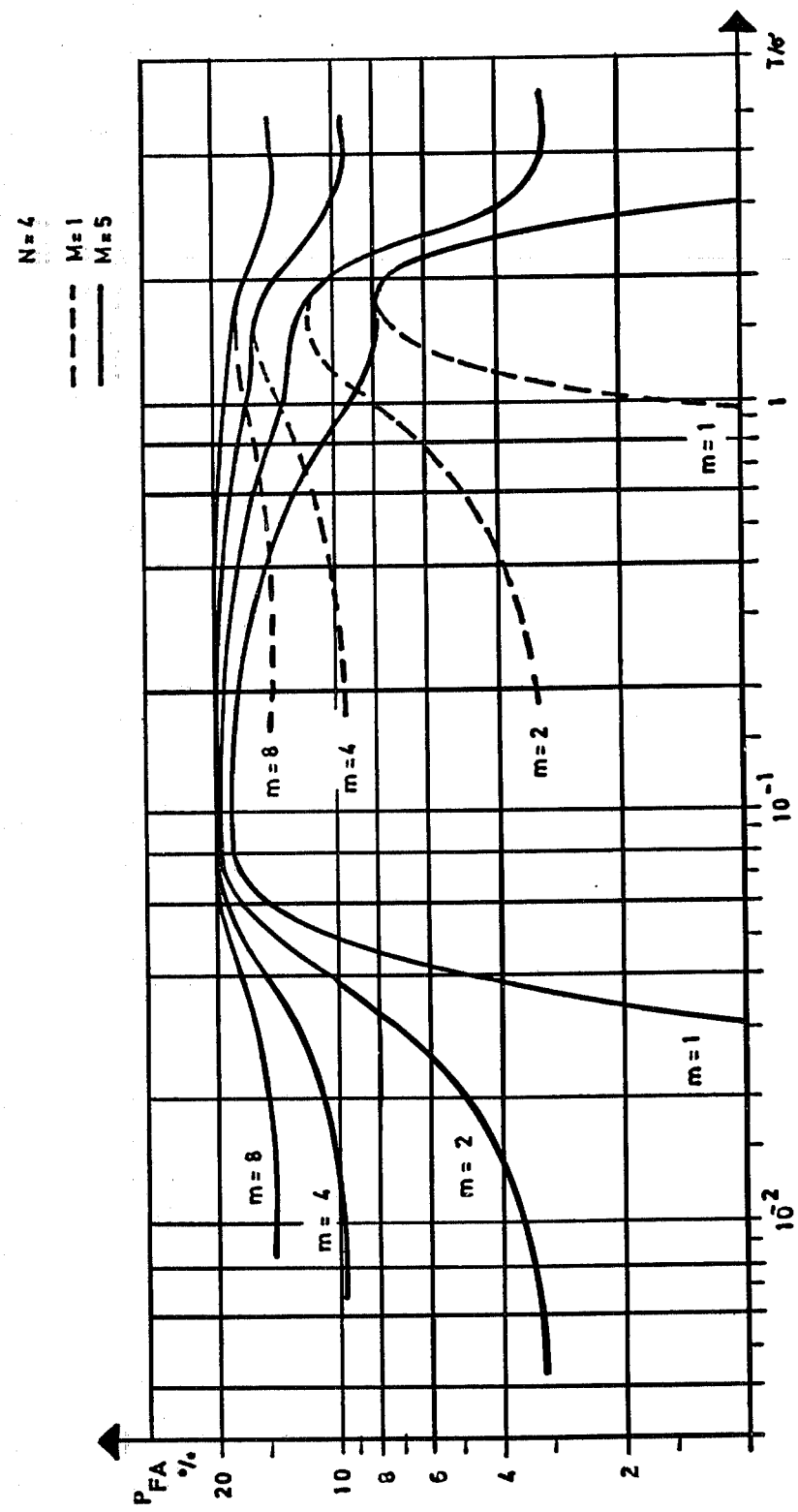
FIG. 7 is a graph which illustrates, for the system in FIG. 5, the behaviour of the probability of false alarm as a function of the $T/\sigma$ ratio.

FIG. 7, presents a diagram which shows the behaviour of the false alarm probability (Pfa) as a function of $T/\sigma$ for the system represented in FIG. 5, in the case when comparing device 32 makes the decision with majority logic the number of the lateral terminals being $N = 4$, and the number of the conversion binary number or bit being $M = 1$ and $M = 5$ for various values of parameter $m = 2^H$.

It is evident how, in the considered $T/\sigma$ interval, the value of the false alarm probability has a constant value, which is equal to the value which is obtained with the analog system in FIG. 1 and which is given by $1/N + 1$.

That fact shows how, when increasing the binary numbers or bits of the injected noise, there is obtained, with an ever increasing accuracy, the CFAR characteristic.

Finally, in FIG. 8, there is shown the behaviour of the detection probability Pd, assuming that the disturbance present on the lateral terminals can be analyzed with the RAYLEIGH distribution, and that the useful signal, present only on the central terminal, has the RICE distribution, as a function of the signal/noise ratio. There are shown the Pd behaviours for various $m$ values, with reference to the case $N = 4$, $M = 5$ and $T/\sigma = 0.6$. It can be seen with respect to the analog case (solid line) that there is practically no further loss when $m$ is high enough (it is sufficient when $m=8$) and when the value $T/\sigma$ is such that it permits the obtaining of a Pfa which is approximately the analog value.

To obtain the curves presented in this specification, "majority logic" has been used. That is, the largest number of the N numbers obtained was used in plotting.

This invention has been described in a manner that is considered to be understandable and capable of being carried out by persons skilled in this particular art. FIG. 5 of the drawings discloses the basic invention in block diagram form. The various elements which comprise the circuit and shown in the block diagram are commercially available, and hence are not described in detail. To complete this disclosure, there is set out below, an identification of at least one commercially available form of each of the components that make up the block diagram of FIG. 5.

Converter 22 can be a model DATEL ADCH-103-2A converter as manufactured by Texas Instruments, Inc. and of which M, for instance five, of the ten output bits are utilized.

Noise Generator 25 can be a parallel converter consisting of, for example, seven Model A710 Texas Instruments, Inc. comparators and one Model 9318 Texas Instruments, Inc. priority encoder.

The first and second digital delay lines 23 and 27 can consist of a line comprising a shift register which can be obtained by connecting in series a number of Texas Instruments, Inc. Model SN74195 J-K flip-flop devices. The clock frequency and the number of stages establish the delay time. Such a line is repeated in parallel, M times for the block 23 and H times for the block 27.

The processing block 30 and the comparator block 32 shown in FIG. 5 can consist of the same type of circuit consisting of a group of Texas Instruments, Inc. Model 710 comparators, each serving to compare the value at the central tap with that at one of the side lines, the outputs of which are transmitted to a Texas Instruments, Inc. Model 9318 priority encoder.

Instruments as specifically identified above as being products of Texas Instruments, Inc. are also manufactured and sold by Motorola Corporation, Fairchild Company and others, all of which are generally available on the market.

The present invention has been described and illustrated with special reference to one of its forms of execution, but it is understood that modifications and substitutions can be made without departure from the scope of protection of industrial patent rights.

We claim:

1. Apparatus for obtaining constant false alarm probability in radar signals comprising:
   means to transform analog video signals into M bit digital signals;
   a first digital delay block comprising M digital delay lines connected to receive said digital signals and having a central M-bit output and N lateral outputs of M-bits,
   means for generating a and H-bit binary noise signal;
   a second digital delay block comprising H digital delay lines for receiving said binary noise signal and having a central H-bit output and N lateral outputs, each one comprising H-bits;
   computing means for generating a signal word corresponding to the value of the M+H bits by processing the N-lateral outputs of the first digital delay line block and by processing the N-lateral outputs from the second digital delay line block; and
   comparator means connected to receive the output signal from said computing means and the signals from the central bit outputs of said first digital delay block and said second digital delay block for generating a quantized video signal.

2. The apparatus as claimed in claim 1 wherein said comparator means functions in accordance with a choice criterion with majority logic.

3. The apparatus as claimed in claim 1 wherein said means for generating a binary noise signal is a random number generator.

* * * * *